(12) United States Patent
Krishnapillai et al.

(10) Patent No.: US 11,494,329 B2
(45) Date of Patent: Nov. 8, 2022

(54) NVME-MI OVER SMBUS MULTI-MASTER CONTROLLER WITH OTHER SMBUS AND I2C MASTERS IN A SINGLE FPGA CHIP

(71) Applicant: Advantest Corporation, Tokyo (JP)

(72) Inventors: Yogen Krishnapillai, San Jose, CA (US); Linden Hsu, San Jose, CA (US); Mike Bautista, San Jose, CA (US)

(73) Assignee: Advantest Corporation, Tokyo (JP)

( * ) Notice: Subject to any disclaimer, the term of this patent is extended or adjusted under 35 U.S.C. 154(b) by 0 days.

(21) Appl. No.: 17/170,574

(22) Filed: Feb. 8, 2021

(65) Prior Publication Data

US 2021/0271625 A1   Sep. 2, 2021

Related U.S. Application Data

(60) Provisional application No. 62/982,581, filed on Feb. 27, 2020.

(51) Int. Cl.
   *G06F 13/42*   (2006.01)
(52) U.S. Cl.
   CPC .. *G06F 13/4282* (2013.01); *G06F 2213/0016* (2013.01)
(58) Field of Classification Search
   CPC ......... G06F 13/4282; G06F 2213/0016; G06F 2213/0026; G06F 13/4295
   USPC .................. 710/107, 110, 119, 305, 309
   See application file for complete search history.

(56) References Cited

U.S. PATENT DOCUMENTS

| | | | | |
|---|---|---|---|---|
| 6,591,322 | B1 * | 7/2003 | Ervin | G06F 13/4031 710/110 |
| 7,444,546 | B2 * | 10/2008 | Kimelman | G06F 11/2733 714/31 |
| 10,430,225 | B1 * | 10/2019 | Harland | G06F 13/385 |
| 2004/0059852 | A1 * | 3/2004 | Sun | G06F 13/4291 710/110 |
| 2004/0177205 | A1 * | 9/2004 | Schoner | G06F 13/4027 710/305 |
| 2006/0174044 | A1 * | 8/2006 | Bomhoff | G06F 13/4286 710/110 |
| 2008/0238712 | A1 * | 10/2008 | Thurmond | G06Q 50/06 340/870.02 |
| 2009/0257444 | A1 * | 10/2009 | Kippley | H04L 12/403 370/438 |

(Continued)

FOREIGN PATENT DOCUMENTS

WO      2019070361 A1    4/2019

OTHER PUBLICATIONS

NVM Express. Management Interface. Revision 1.1. Apr. 29, 2019. 151 pp.

*Primary Examiner* — Idriss N Alrobaye
*Assistant Examiner* — Henry Yu (57) ABSTRACT

A method for conducting bus arbitration in a hardware tester system comprising a single master controller and a multi-master controller comprises configuring the single master controller with arbitration logic operable to communicate on a bus in the hardware tester system using a same arbitration scheme as the multi-master controller, wherein the single master controller and the multi-master controller are connected to the bus. Further, responsive to a determination by the arbitration logic that the multi-master controller controls the bus, the method comprises withdrawing the single master controller from attempting to control the bus.

16 Claims, 4 Drawing Sheets

(56) References Cited

U.S. PATENT DOCUMENTS

2015/0378959 A1* 12/2015 Jones ................ G06F 3/061
 710/110
2017/0083249 A1 3/2017 Yang et al.
2017/0315851 A1* 11/2017 Hicks ............ G06F 11/0793

* cited by examiner

NVME-MI OVER SMBUS MULTI-MASTER CONTROLLER WITH OTHER SMBUS AND I2C MASTERS IN A SINGLE FPGA CHIP

CROSS-REFERENCE TO RELATED APPLICATIONS

This present application claims priority to U.S. Provisional Application 62/982,581, titled "NVMe-MI Over SMBus Multi-Master Controller with other SMBus/I2C Masters in a Single FPGA Chip,", filed on Feb. 27, 2020. The entire contents of each of the above-listed applications is hereby incorporated by reference for all purposes as if fully set forth herein.

FIELD OF THE INVENTION

The present disclosure relates generally to the field of electronic device testing systems and more specifically to the field of electronic device testing equipment for testing devices under test (DUTs).

BACKGROUND OF THE INVENTION

NVM Express (NVMe) or Non-Volatile Memory Host Controller Interface Specification is an open logical-device interface specification for accessing non-volatile storage media attached via PCI Express (PCIe) bus. The non-volatile memory is often NAND flash memory that comes in several physical form factors, including solid-state drives (SSDs), PCI Express (PCIe) add-in cards, M.2 cards, and other forms. NVMe, as a logical-device interface, has been designed to capitalize on the low latency and internal parallelism of solid-state storage devices.

NVMe-MI (NVMe Management Interface) specification defines a programmable interface, including a command set and architecture, for managing NVMe storage, thereby, making it possible to discover, monitor, configure and update NVMe devices in multiple operating environments. Communication associated with NVMe-MI may be conducted over a System Management Bus/Inter-Integrated Circuit Bus (SMBus). When an NVMe-MI over SMBus Multi-Master Controller shares the bus with other existing Single Master SMBus/I2C Controllers, there is a potential problem of mixing the Single and Multi-Masters Controllers together as will be discussed in connection with FIG. 1 below.

Figure 1:
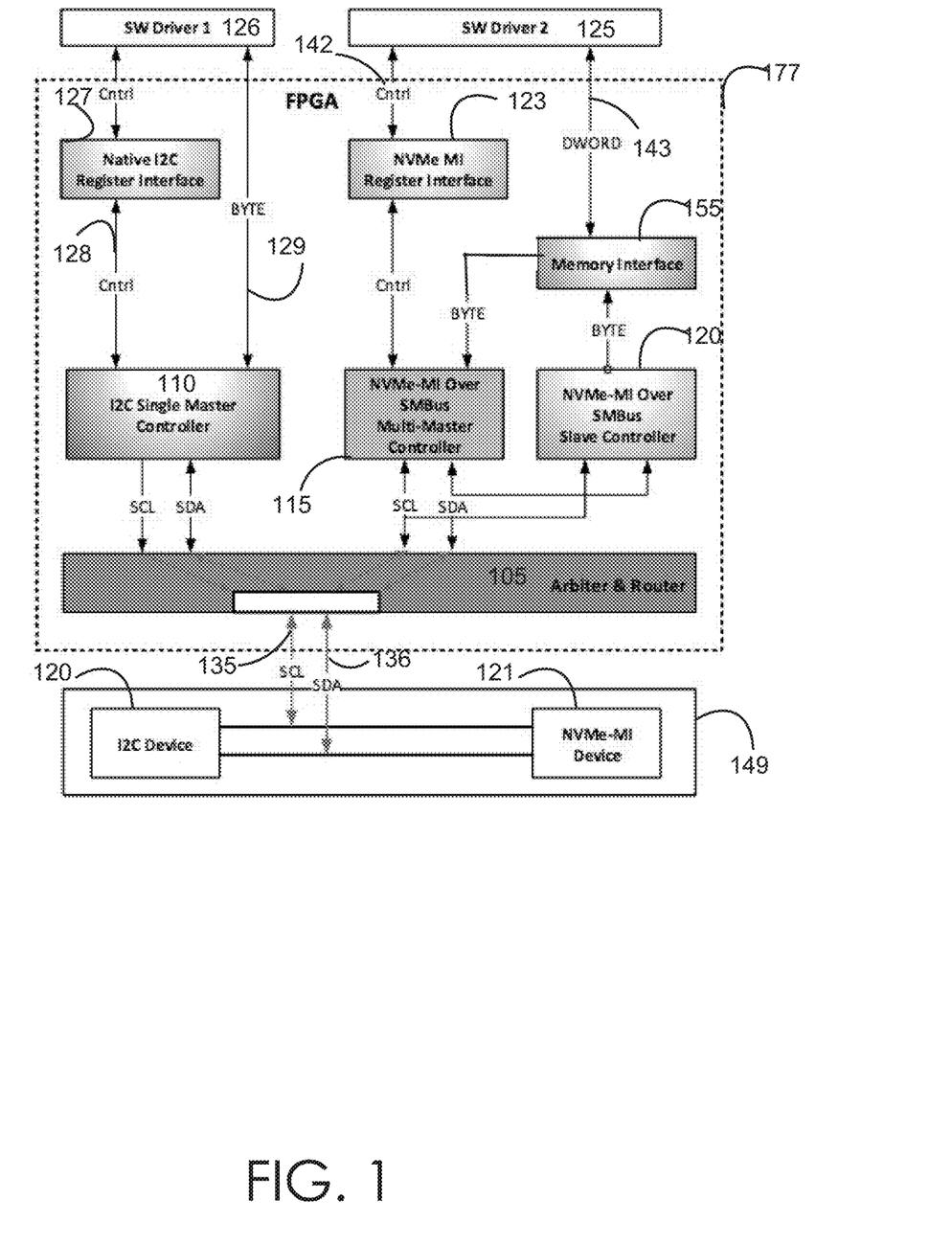
FIG. 1 illustrates an FPGA chip layout comprising both single master controllers and multi-master controllers.

FIG. 1 illustrates a conventional FPGA chip layout comprising both single master controllers and multi-master controllers. In a typical scenario, single master controller (e.g., I2C single master controller 110) and multi-master controllers (e.g., NVMe-MI over SMBus Multi-Master Controller 115) should not be mixed together in the same bus because the single master would not understand the multi-master's arbitration process. In the multi-master arbitration process, when two masters are trying to compete to control the bus at the same time, the master that writes '0's to the bus will win the arbitration while other master that writes '1's to the bus will lose the arbitration. But the single master would not understand this special arbitration mechanism required by the multi-master. Therefore, the single master will interrupt the multi-master if both are connected on the same bus. Secondly, in most of the existing systems, the SMBus/I2C multi-master controllers are usually integrated within separate chips which cause chip-to-chip interconnect challenges, for example, when a multi-master controller chips attempts to communicate with chips comprising single masters.

BRIEF SUMMARY OF THE INVENTION

Accordingly, a need exists for an apparatus and/or method that can address the problems with the approaches described above. Using the beneficial aspects of the apparatus and/or method described, without their respective limitations, embodiments of the present disclosure provide a novel solution to address these problems.

Embodiments of the present invention provide a hardware system that comprises both I2C and/or SMBus single master controllers and multi-master SMBus/I2C controllers where the single master controllers have been configured to interface and communicate similar to multi-master controllers so that the single master controllers are able to understand the common arbitration process that a multi-master controller utilizes.

In one embodiment, a method for conducting bus arbitration in a hardware tester system is disclosed. The method comprises a single master controller and a multi-master controller comprises and configuring the single master controller with arbitration logic operable to communicate on a bus in the hardware tester system using a same arbitration scheme as the multi-master controller, wherein the single master controller and the multi-master controller are connected to the bus. Further, responsive to a determination by the arbitration logic that the multi-master controller controls the bus, the method comprises withdrawing the single master controller from attempting to control the bus.

In one embodiment, an apparatus comprises a single master controller comprising arbitration logic, a bus and a multi-master controller communicatively coupled to the single master controller over the bus. The arbitration logic is operable to communicate on the bus using a same arbitration scheme as the multi-master controller. Further, responsive to a determination by the arbitration logic that the multi-master controller controls the bus, the arbitration logic is further configured to withdraw the single master controller from attempting to control the bus.

In one embodiment, a system comprises a single master controller comprising arbitration logic, a bus and a plurality of multi-master controllers communicatively coupled to the single master controller over the bus. The arbitration logic is operable to communicate on the bus using a same arbitration scheme as the plurality of multi-master controllers. Further, responsive to a determination by the arbitration logic that a multi-master controller of the plurality of multi-master controllers controls the bus, the arbitration logic is further configured to withdraw the single master controller from attempting to control the bus.

The following detailed description together with the accompanying drawings will provide a better understanding of the nature and advantages of the present invention.

BRIEF DESCRIPTION OF THE DRAWINGS

Embodiments of the present invention are illustrated by way of example, and not by way of limitation, in the figures of the accompanying drawings and in which like reference numerals refer to similar elements.

In the figures, elements having the same designation have the same or similar function.

DETAILED DESCRIPTION OF THE INVENTION

Reference will now be made in detail to embodiments, examples of which are illustrated in the accompanying drawings. While the embodiments will be described in conjunction with the drawings, it will be understood that they are not intended to limit the embodiments. On the contrary, the embodiments are intended to cover alternatives, modifications and equivalents. Furthermore, in the following detailed description, numerous specific details are set forth in order to provide a thorough understanding. However, it will be recognized by one of ordinary skill in the art that the embodiments may be practiced without these specific details. In other instances, well-known methods, procedures, components, and circuits have not been described in detail as not to unnecessarily obscure aspects of the embodiments.

NOTATION AND NOMENCLATURE SECTION

Some regions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "testing," "communicating," "coupling," "converting," "relaying," "attempting," "controlling," "configuring," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The description below provides a discussion of computers and other devices that may include one or more modules. As used herein, the term "module" or "block" may be understood to refer to software, firmware, hardware, and/or various combinations thereof. It is noted that the blocks and modules are exemplary. The blocks or modules may be combined, integrated, separated, and/or duplicated to support various applications. Also, a function described herein as being performed at a particular module or block may be performed at one or more other modules or blocks and/or by one or more other devices instead of or in addition to the function performed at the described particular module or block. Further, the modules or blocks may be implemented across multiple devices and/or other components local or remote to one another. Additionally, the modules or blocks may be moved from one device and added to another device, and/or may be included in both devices. Any software implementations of the present invention may be tangibly embodied in one or more storage media, such as, for example, a memory device, a floppy disk, a compact disk (CD), a digital versatile disk (DVD), or other devices that may store computer code.

The terminology used herein is for the purpose of describing particular embodiments only and is not intended to limit the scope of the present invention. As used throughout this disclosure, the singular forms "a," "an," and "the" include plural reference unless the context clearly dictates otherwise. Thus, for example, a reference to "a module" includes a plurality of such modules, as well as a single module, and equivalents thereof known to those skilled in the art.

NVME-MI Over SMBUS Multi-Master Controller with Other SMBUS and I2C Masters in a Single FPGA Chip As discussed previously, when an NVMe-MI over SMBus Multi-Master Controller shares the bus with other existing Single Master I2C/SMBus Controllers, there is a potential problem of mixing the Single and Multi-Masters Controllers together. This problem is illustrated in connection with FIG. 1.

FIG. 1 illustrates a conventional FPGA chip 177 comprising both single master controllers (e.g., I2C/SMBus single master controller 110) and multi-master controllers (e.g., NVMe-MI over I2C/SMBus multi-master controller 115). Both software driver 1 126 and software driver 2 125 interface and communicate with the FPGA 177.

Software driver 1 126 transmits control signals 128 and data signals 129 to the I2C/SMBus single master controller 110 providing information regarding the commands, addresses and data needed to communicate with an I2C device 120 connected to the FPGA 177. As mentioned above, an I2C/SMBus single master controller typically supports only one master on an I2C/SMBus bus. The single master controller converts I2C/SMBus commands into signals that may be communicated on the two (2) wire I2C/SMBus interface (comprising clock line 135 and data line 136). Note that the I2C device 120 may be a device external to the FPGA on the I2C/SMBus bus, for example, which is comprised within a solid state drive (SSD) or similar device 149. The single master controller 110 communicates command, addresses and data information to the I2C device 120 inside the SSD 149 for purposes of reading data from the device or writing data to the device. The I2C device 120 may act as either a master or slave device.

The register interface 127 provides the interface for signals (e.g., control signals) between the software driver 1

126 and the single master controller 110. The register interface 127 may be used to buffer information from the software driver 1 126 and may also be accessed by logic within the FPGA 177.

Software driver 2 125 transmits control signals 142 and data words 143 to the NVMe-MI over I2C/SMBus multi-master controller 115 and I2C/SMBus slave controller 120 providing information regarding the commands, addresses and data needed to communicate with an NVMe device 121 connected to the FPGA 177. Note that a multi-master controller supports more than one master on an I2C/SMBus bus. The multi-master controller converts I2C/SMBus commands to be communicated on the two (2) wire I2C/SMBus interface (e.g., comprising clock line 135 and data line 136). The multi-master controller includes logic to arbitrate bus access collisions between masters on the I2C/SMBus bus. The I2C/SMBus slave controller 120 slave device does not initiate activity on the I2C/SMBus bus. The slave device responds to commands issued by a master device.

It will be appreciated that similar to device 120, the NVMe-MI device 121 may, for example, also be a device comprised within the SSD (or other type of device) 149. The NVMe-MI device supports the NVMe-MI specification. Further, the NVMe-MI device 121 may be programmed as a multi-master off chip that is able to control the I2C interface (comprising control data line 136 and clock line 135) to communicate with, for example, an I2C/SMBus slave controller 120 during a read operation. Alternatively, when being written to, the NVMe-MI device 121 is able to relinquish control to NVMe-MI over I2C/SMBus multi-master controller 115 in accordance with the I2C specification. Note that the I2C specification specifies the protocol for sharing an I2C/SMBus bus when multiple masters are connected to the same bus (or lines). The I2C specification, for example, specifies the manner in which one of the multi-masters may back off if another multi-master attempts to take control of the bus.

The I2C/SMBus multi-master controller 115 communicates command, addresses and data information to the NVMe device 121 for purposes of reading data from the device or writing data to the device. The register interface 123 provides the interface for signals (e.g., control signals) between the software driver 2 125 and the I2C/SMBus multi-master controller 115. Memory interface 155 stores data words communicated between the software driver 2 125 and the I2C/SMBus multi-master controller 115. The data words buffered using memory interface 155 may be words that are either read from NVMe device 121 or data words from the software driver 2 125 to be written to the NVMe device 1212. Data words from the software driver 2 125 to be written to the NVMe device 121 are routed from the memory interface 155 through I2C/SMBus multi-master controller 115. Data words read from the NVMe device 121 (acting as a multi-master off chip) routed through I2C/SMBus slave controller 120 to the memory interface 155. Both the register interface 123 and the memory interface 155 may be used to buffer information from the software driver 2 125 and may also be accessed by logic within the FPGA 177.

The I2C/SMBus single master controller 110 and the I2C/SMBus multi-master controller 115 both interface with an arbiter and router module 105, which for example may determine which controller gets access to the control data line 136 and clock line 135 for purposes of communicating with devices 120 and 121. For example, the arbiter and router module 105 may determine whether the NVMe device 1212 obtains access to the control data line 136 and clock line 135 for a read operation or whether the I2C/SMBus multi-master controller 115 gets access to the lines during a write operation. The arbiter and router module 105 allows for only one controller to control the bus and prevents any other controller from accessing the bus while a different controller commands the bus.

As mentioned above, in a typical scenario, single master (e.g., I2C/SMBus single master controller 110) and multi-master controllers (e.g., NVMe-MI over I2C/SMBus Multi-Master Controller 115) should not be mixed together on the same bus (or lines) because the single master would not understand the multi-master's arbitration process. For example, referencing FIG. 1, in a typical scenario, connecting the I2C/SMBus single master controller 110 and the NVMe-MI over I2C/SMBus Multi-Master Controller 115 to the same bus (e.g., lines 135 and 136) would be problematic because the I2C/SMBus single master controller 110 does not understand the bus arbitration scheme used by the I2C/SMBus Multi-Master Controller 115. In other words, the I2C specification does not provide for an arbitration scheme that accommodates both single master and multi-master controllers being connected to the same bus.

In the multi-master arbitration process, when two masters are trying to compete to control the bus at the same time, the master that writes '0's to the bus will win the arbitration while other master that writes 1's to the bus will lose the arbitration. But the single master (e.g., I2C single master controller 110) would not understand this special arbitration mechanism required by the multi-master. Therefore, the single master will interrupt the multi-master if both are connected on the same bus.

Figure 2:
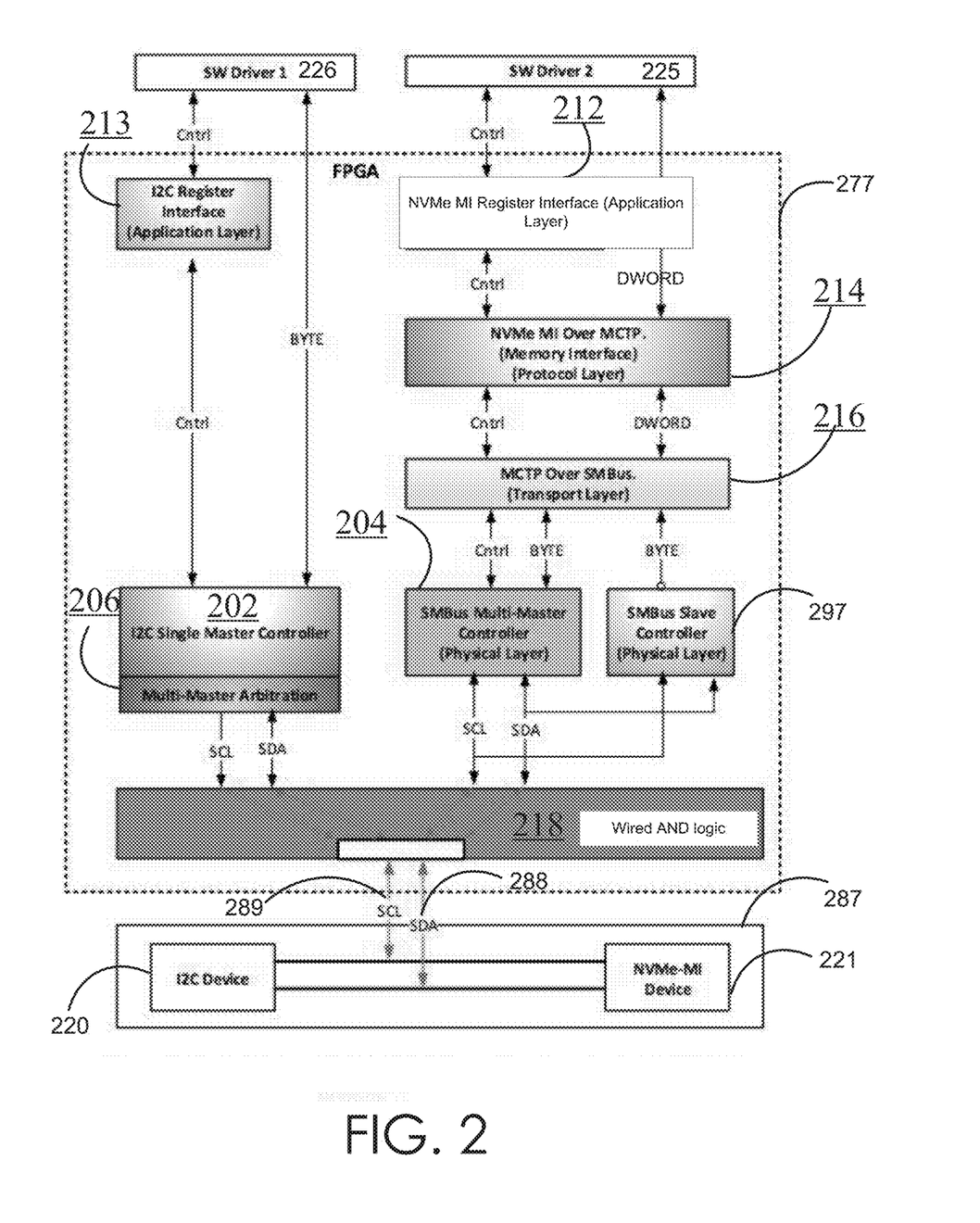
FIG. 2 is a high level schematic block diagram of the a hardware tester system comprising both single master controllers and multi-master controllers where the single master controllers are configured to use an arbitration process typically used for multi-master controllers, according to one embodiment of the present invention.

FIG. 2 is a high level schematic block diagram of the a hardware tester system comprising both single master controllers and multi-master controllers where the single master controllers are configured to use an arbitration process typically used for multi-master controllers, according to one embodiment of the present invention. FIG. 2 illustrates an FPGA chip 277 (similar to the one shown in FIG. 1) in which multi-master arbitration logic may be implemented and integrated within an existing I2C/SMBus single master controller 202 in accordance with an embodiment of the present invention. As shown in FIG. 2, the single master controller 202 comprises multi-master arbitration logic module 206 which contains logic to perform arbitration when a multi-master (e.g., I2C/SMBus Multi-Master Controller 204 or NVMe_MI device 221) attempts to communicate on the bus (e.g., clock line 289 and data line 288). In other words, arbitration logic module 206 allows the single master controller 202 to use the arbitration scheme of a multi-master as defined by the I2C protocol so that it will not interrupt communication if another multi-master has control of the I2C/SMBus interface. For example, the arbitration module 206 may instruct the single master controller 202 to back-off when another multi-master attempts to write '0's on the I2C interface (e.g., comprising clock line 289 and data line 288).

When a hardware system comprises both single and multi-master controllers, the overall system design should be architected in such a way to configure all the masters to act as multi-masters in order to understand the common arbitration process that a multi-master controller utilizes. As shown in FIG. 2, the multi-master arbitration logic module 206 is implemented and integrated with an existing single master controller 202 so that the single master acts like a multi-master and is able to sense and respond to the multi-master arbitration process. The multi-master arbitration logic module 206 converts the single-master controller to behave similarly to a multi-master controller on an I2C/SMBus in a way such that the conversion does not impact software, in particular, software driver 1 226.

In one embodiment, the NVMe-MI over SMBus design of FIG. 2 is designed as a layered architecture. The layers may comprise an Application layer (Software/Register Interface, e.g., modules 213 and 212), Protocol layer (NVMe MI over MCTP), e.g., module 214, Transport layer (MCTP over SMBus), e.g., module 216, and Physical Layer (I2C/SMBus multi-master controller), e.g., module 204 as shown in FIG. 2.

Software drivers 226 and 225 provides the interface to hardware (similar to the implementation shown in FIG. 1). In one implementation, software driver 1 226 allows software applications access to I2C devices (e.g., I2C device 220) on the I2C/SMBus without interfacing directly with the hardware. Similarly, software driver 2 225 allows software applications access to NVMe-MI devices (e.g., NVMe-MI device 221) without interfacing directly with the hardware.

In one embodiment, the NVMe-MI Register Interface 212 comprises a set of hardware registers used to move data between software applications and NVMe-MI devices (e.g., device 221) on an I2C/SMBus (e.g., clock line 289 and data line 288). The I2C Register Interface 213 comprises a set of hardware registers used to move data between software applications and I2C devices (e.g., device 220) on the I2C/SMBus bus.

In one embodiment, the NVMe-MI over MCTP module 214 comprises a control layer that supports NVMe-MI messages issued by software applications. The NVMe-MI messages are converted to one or more MCTP commands. The MCTP over SMBus module 216 comprises a control layer than supports conversion of MCTP commands into one or more I2C/SMBus commands. Note that I2C/SMBus multi-master controller 204 and I2C/SMBus slave controller 297 comprise the physical layer and perform substantially the same functions as corresponding modules illustrated in FIG. 1.

In one embodiment, the wired AND logic 218 comprises logic that emulates wire connection between devices on the I2C/SMBus. Typically, I2C/SMBus devices are physically connected by wire. Each device connection is supported by an open-drain gate. A pull-up resistor on the I2C/SMBus signal lines (e.g., clock 289 and data 288) pulls the signal line high when all devices are not attempting to drive the signal lines low. Within an FPGA there are no open-drain signal paths available. To emulate the open-drain gate operation of the I2C/SMBus, wired AND logic 218 is implemented. Any AND gate input that is low will drive the output of the AND gate low. The AND operation is similar to what occurs when one device on an I2C/SMBus attempts to drive signal line low. Each controller within the FPGA 277 has an input to the wired AND logic 218. The output of the AND connection 218 is used to drive the FPGA I2C/SMBus pins connected to device 287 (which may be a solid state drive as discussed above).

As mentioned above, the I2C specification states single-master controllers and multi-master controllers cannot coexist on the same I2C/SMBus bus. Conventionally, automated test equipment (ATE) systems only comprised multiple single master controllers with access to the same I2C/SMBus bus, but only one of them could communicate on the bus at a time using arbitration logic inserted between the single master controllers and the physical I2C/SMBus bus (using a non-standard I2C implementation).

With the recent addition of NVME-MI capability in ATE systems, a need arose to add a multi-master controller (e.g., an I2C/SMBus Multi-Master Controller 204) to the mix of controllers with access to the same I2C/SMBus bus. Since single-master and multi-master controllers cannot coexist on the same I2C/SMBus bus (per the I2C specification), conventional tester systems needed to incorporate a switch that allows single-master controllers or multi-master controllers access to the I2C/SMBus bus, but not both.

Embodiments of the present invention add a multi-master bus arbitration module 206 to single-master controllers (e.g., controller 206), which eliminates the need for a switch and allows the I2C/SMBus bus access to all I2C/SMBus controllers, including both single masters and multi-masters. Embodiments of the present invention add a multi-master arbitration module to single-master controllers so all of the I2C/SMBus controllers (both single masters and multi-master controllers) can coexist on the same I2C bus with the NVME-MI controller device (e.g., device 221).

In one embodiment, the interface between single master controller 202 and the software driver 1 226 does not change with the addition of the multi-master arbitration module 206. Thus, there is no impact on existing software for single-master controllers. In other words, adding a multi-master arbitration module 206 to the single master controllers prevents the need for any application layer logic and software driver modification.

In one embodiment, the arbitration scheme programmed into the multi-master arbitration module 206 comprises a retry mechanism and fair-sharing mechanism applicable for devices with multiple I2C masters co-existing on a single I2C/SMBus bus. For example, the retry mechanism enables the single master controller 202 to make attempts to take control of the bus over periodic intervals if a different master is controlling the bus.

Figure 3:
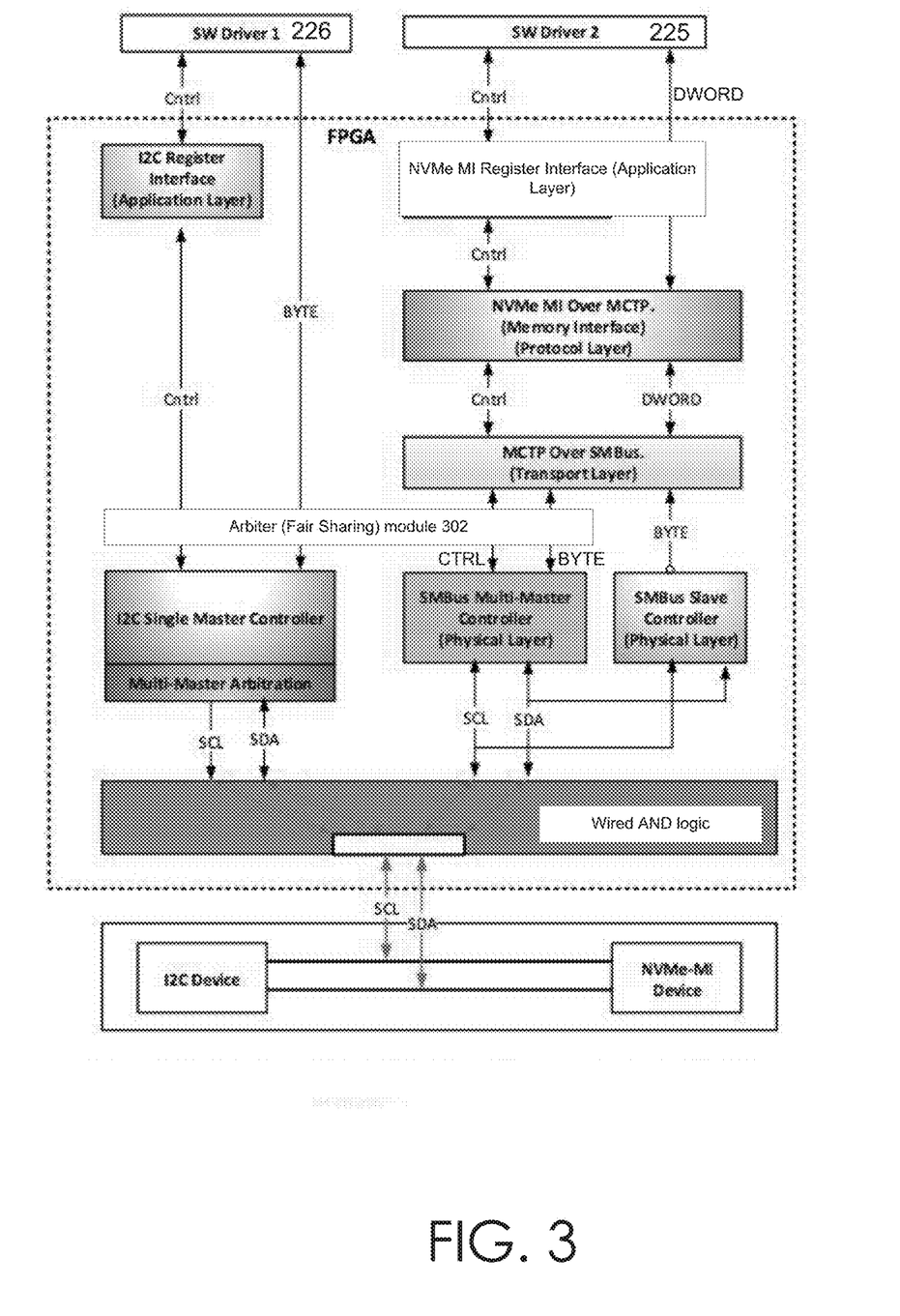
FIG. 3 is a high level schematic block diagram of the hardware tester system comprising both single master controllers, multi-master controllers and an arbiter for fair sharing, according to one embodiment of the present invention.

FIG. 3 is a high level schematic block diagram of the a hardware tester system comprising both single master controllers, multi-master controllers and an arbiter for fair sharing, according to one embodiment of the present invention. Note that FIG. 3 is similar to FIG. 2 except for the addition of an arbiter module 302 that enables fair sharing between controllers (single master and multi-master controllers). The arbiter eliminates local (within FPGA) I2C/SMBus collisions.

The layered architecture of FIG. 2 facilitates the co-existence of one multi-master controller with another single master or multi-master controller, where one or more single masters and multi-master controllers work together seamlessly with a common bus arbitration scheme. Integrating the single masters and multiple multi-masters in a single FPGA chip also helps to eliminate the chip-to-chip interconnect challenges. In one embodiment, the scheme shown in FIG. 2 can be expanded to support any number of single master controllers and multi-master controllers inside the single FPGA Chip. Further embodiments of the present invention also enable flexible routing of multi-masters and single-masters to multiple sets of I2C/SMBus buses.

Figure 4:
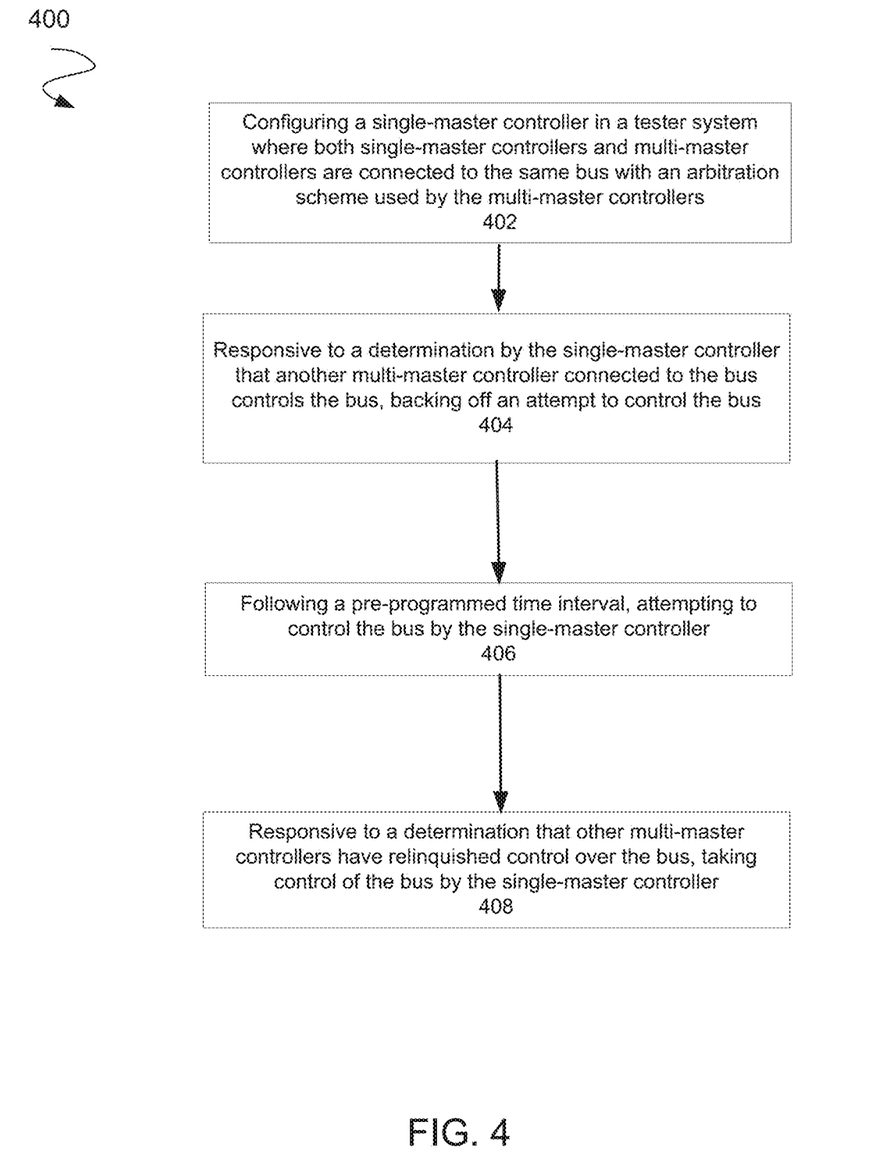
FIG. 4 depicts a flowchart of an exemplary process of conducting bus arbitration in a hardware tester system comprising both I2C single master controllers and multi-master SMBus/I2C controllers according to an embodiment of the present invention.

FIG. 4 depicts a flowchart of an exemplary process of conducting bus arbitration in a hardware tester system comprising both I2C/SMBus single master controllers and multi-master I2C/SMBus controllers according to an embodiment of the present invention. The invention, however, is not limited to the description provided by flowchart 400. Rather, it will be apparent to persons skilled in the relevant art(s) from the teachings provided herein that other functional flows are within the scope and spirit of the present invention.

At step 402, the single master controllers (e.g., single master controller 202) are configured with a multi-master arbitration scheme (e.g., using multi-master arbitration module 206) that allows the single master controllers (e.g., controller 202) to use an arbitration process typically used for multi-master controllers. In other words, the multi-master arbitration conducted on the I2C/SMBus is transparent to the single-master controller. The multi-master arbitration scheme implemented by multi-master arbitration module 206 includes back-off and retry mechanisms. By comparison, conventional single-master controllers do not have back-off or retry mechanisms. For example, the arbitration module 206 may back-off and retry later when another multi-master attempts to write '0's on the I2C/SMBus interface (e.g., comprising clock line 289 and data line 288).

At step 404, responsive to a determination by multi-master arbitration module 206 that another controller (e.g., a single master or multi-master controller) is controlling the bus (to which both the single-master and the multi-master controllers are connected), the multi-master arbitration module 206 backs off attempting to take control of the bus.

At step 406, after a pre-programmed time interval, the multi-master arbitration module 206 makes another attempt (retry) at controlling the bus.

At step 408, responsive to a determination that other multi-master controllers connected to the bus have relinquished control, the multi-master arbitration module 206 takes control of the bus, e.g., by attempting to write '0's on the bus.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method for conducting bus arbitration in a hardware tester system comprising a single master controller and a multi-master controller, the method comprising:
configuring the single master controller with arbitration logic operable to communicate on a bus in the hardware tester system using a same arbitration scheme as the multi-master controller, wherein the single master controller and the multi-master controller are coupled to the bus, and wherein the single master controller communicates with an I2C device, and wherein the multi-master controller communicates with a NVMe-MI (NVMe Management Interface) device; and
responsive to a determination by the arbitration logic that the multi-master controller controls the bus, withdrawing the single master controller from attempting to control the bus and following a pre-programmed duration, the arbitration logic invoking a retry mechanism to attempt to control the bus again.

2. The method of claim 1, further comprising:
responsive to a determination that the multi-master has relinquished control over the bus, the arbitration logic taking control of the bus to enable the single master controller to communicate on the bus.

3. The method of claim 1, wherein the single master controller and the multi-master controller comprise an I2C/System Management Bus (SMBus) controller.

4. The method of claim 1, wherein the arbitration logic enables fair-sharing between the single master controller and the multi-master controller.

5. The method of claim 1, wherein the single master controller and the multi-master controller are integrated within a single FPGA chip.

6. The method of claim 1, wherein the determination by the arbitration logic that the multi-master controller controls the bus is performed by determining if the multi-master controller is attempting to write '0's on the bus.

7. The method of claim 1, wherein the single master controller comprises a I2C/SMBus single master controller, wherein the multi-master controller comprises a I2C/SMBus muti-master controller, and wherein the bus comprises an I2C/SMBus interface.

8. The method of claim 7, wherein the bus comprises a layered architecture operable to enable an NVMe-MI (NVMe Management Interface) device to communicate over the I2C/SMBus interface.

9. The method of claim 1, wherein the bus comprises a clock signal and a data signal.

10. An apparatus comprising:
a single master controller comprising an arbiter;
an I2C device;
a NVMe-MI (NVMe Management Interface) device;
a bus; and
a multi-master controller communicatively coupled to the single master controller over the bus, wherein the single master controller communicates with the I2C device, and wherein the multi-master controller communicates with the NVMe-MI (NVMe Management Interface) device, and wherein the arbiter is operable to:
communicate on the bus using a same arbitration procedure as the multi-master controller; and
responsive to a determination by the arbiter that the multi-master controller controls the bus, the arbiter is configured to withdraw the single master controller from attempting to control the bus and following a pre-programmed duration, the arbiter is further configured to invoke a retry mechanism to attempt to control the bus again.

11. The apparatus of claim 10, wherein the multi-master controller comprises a I2C/SMBus muti-master controller, and wherein the single master controller comprises a I2C/SMBus single master controller.

12. The apparatus of claim 10, wherein the single master controller and the multi-master controller are integrated within an FPGA chip, wherein the arbiter is transparent to the single master controller, and wherein the arbiter is further transparent to other modules in the FPGA chip.

13. The apparatus of claim 10, wherein the single master controller and the multi-master controller are integrated within a single FPGA chip.

14. A system comprising:
a single master controller comprising arbitration logic;
a bus; and
a plurality of multi-master controllers communicatively coupled to the single master controller over the bus, wherein the single master controller communicates with an I2C device, and wherein at least one of multi-master controllers communicates with a NVMe-MI (NVMe Management Interface) device, and wherein the arbitration logic is operable to communicate on the bus using a same arbitration scheme as the plurality of multi-master controllers, and wherein further responsive to a determination by the arbitration logic that a multi-master controller of the plurality of multi-master controllers controls the bus, the arbitration logic is configured to withdraw the single master controller from attempting to control the bus, and wherein following a pre-programmed time duration, the arbitration logic is further configured to attempt to control the bus using a retry mechanism to allow the single master controller to communicate on the bus.

15. The system of claim 14, wherein the single master controller comprises a I2C/SMBus single master controller, wherein the multi-master controller comprises a I2C/SMBus muti-master controller, and wherein the bus comprises an I2C/SMBus interface.

16. The system of claim 14, wherein responsive to a determination that the multi-master has relinquished control over the bus, the arbitration logic is further configured to take control of the bus to allow the single master controller to communicate on the bus.

\* \* \* \* \*